United States Patent
Kim et al.

(10) Patent No.: US 9,631,927 B2
(45) Date of Patent: Apr. 25, 2017

(54) ANGULAR VELOCITY SENSOR WITH FLEXIBLE PARTS PROVIDING DIFFERENT RIGIDITIES

(71) Applicant: SAMSUNG ELECTRO-MECHANICS CO., LTD., Suwon-Si (KR)

(72) Inventors: Jong Woon Kim, Suwon-Si (KR); Jung Won Lee, Suwon-Si (KR); Seung Joo Shin, Suwon-Si (KR); Won Kyu Jeung, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 168 days.

(21) Appl. No.: 14/550,838

(22) Filed: Nov. 21, 2014

(65) Prior Publication Data
US 2016/0178373 A1    Jun. 23, 2016

Related U.S. Application Data

(63) Continuation of application No. 13/903,782, filed on May 28, 2013, now Pat. No. 8,919,198.

(30) Foreign Application Priority Data

May 29, 2012 (KR) .................. 10-2012-0056905

(51) Int. Cl.
*G01C 19/00* (2013.01)
*G01C 19/5705* (2012.01)
*G01C 19/16* (2006.01)

(52) U.S. Cl.
CPC ......... *G01C 19/5705* (2013.01); *G01C 19/16* (2013.01)

(58) Field of Classification Search
CPC ..... G01C 19/56; G01C 19/16; G01C 19/5705
See application file for complete search history.

(56) References Cited

U.S. PATENT DOCUMENTS 5,392,650 A * 2/1995 O'Brien ............... G01P 15/131
                                                        73/514.18
5,908,986 A * 6/1999 Mitamura ......... G01C 19/5719
                                                        73/504.12
(Continued)

FOREIGN PATENT DOCUMENTS

EP        2392897       12/2011
JP        60-213814     10/1985
(Continued)

OTHER PUBLICATIONS

Notice of Allowance dated Aug. 26, 2014 for U.S. Appl. No. 13/903,782 (now published as US 2013/0319114).
(Continued)

*Primary Examiner* — Harshad R Patel
*Assistant Examiner* — Samir M Shah
(74) *Attorney, Agent, or Firm* — NSIP Law (57) ABSTRACT

Disclosed herein is an angular velocity sensor. The angular velocity sensor according to an embodiment of the present invention is configured to include a mass body, a first frame disposed at an outer side of the mass body so as to be spaced apart from the mass body, a first flexible part connecting the mass body to the first frame in an X-axis direction, a second flexible part connecting the mass body with the first frame in a Y-axis direction, a second frame disposed at an outer side of the first frame so as to be spaced apart from the first frame, a third flexible part connecting the first frame with the second frame in an X-axis direction, and a fourth flexible part connecting the first frame with the second frame in a Y-axis direction.

14 Claims, 12 Drawing Sheets

(56) References Cited

U.S. PATENT DOCUMENTS

| | | | | |
|---|---|---|---|---|
| 5,992,233 A * | 11/1999 | Clark | ................ | G01C 19/5719 361/280 |
| 6,067,858 A * | 5/2000 | Clark | ................ | G01C 19/5719 73/504.16 |
| 6,964,195 B2 * | 11/2005 | Hobbs | ................ | G01C 19/5719 73/504.12 |
| 8,061,203 B2 * | 11/2011 | Aizawa | ............ | G01C 19/5719 73/504.04 |
| 8,117,914 B2 * | 2/2012 | Ohuchi | ............ | G01C 19/5719 73/504.12 |
| 8,241,923 B2 * | 8/2012 | Morii | ................ | G01C 19/5719 257/414 |
| 8,453,504 B1 * | 6/2013 | Mao | ................ | G01C 19/56 73/504.14 |
| 8,459,111 B1 * | 6/2013 | Mao | ................ | G01C 19/574 73/504.14 |
| 8,479,575 B2 * | 7/2013 | Kempe | ............ | G01C 19/5747 73/504.12 |
| 8,726,730 B1 * | 5/2014 | Nielson | ............ | G01C 19/5726 73/504.01 |
| 2002/0093067 A1 * | 7/2002 | Knowles | ............ | B81B 3/0051 257/419 |
| 2010/0071468 A1 * | 3/2010 | Ohuchi | ............ | G01C 19/5719 73/504.12 |
| 2010/0129215 A1 * | 5/2010 | Preus | ................ | F03D 7/0224 416/41 |
| 2011/0146404 A1 | 6/2011 | Jeung | | |
| 2012/0048017 A1 * | 3/2012 | Kempe | ............ | G01C 19/5747 73/504.12 |
| 2012/0272732 A1 * | 11/2012 | Leverrier | ............ | G01C 19/5747 73/504.12 |
| 2013/0180332 A1 * | 7/2013 | Jia | ................ | G01C 19/5762 73/504.12 |
| 2013/0319114 A1 | 12/2013 | Kim et al. | | |
| 2014/0069189 A1 * | 3/2014 | Kim | ................ | G01C 19/5642 73/514.02 |
| 2014/0084393 A1 * | 3/2014 | Kim | ................ | B81B 3/0067 257/415 |
| 2014/0182375 A1 * | 7/2014 | Kim | ................ | G01C 19/5712 73/504.12 |
| 2014/0208848 A1 * | 7/2014 | Krylov | ............ | B81B 3/0048 73/504.12 |

FOREIGN PATENT DOCUMENTS

| | | | | |
|---|---|---|---|---|
| JP | 06-160421 | 6/1994 | | |
| JP | 07-83667 | 3/1995 | | |
| JP | 10-89968 | 4/1998 | | |
| JP | 2000-88579 | 3/2000 | | |
| JP | EP 2392897 A4 * | 6/2013 | ........ | G01C 19/5726 |
| WO | 99/19689 | 4/1999 | | |

OTHER PUBLICATIONS

Office Action dated Apr. 1, 2014 for Japanese Patent Application No. 2013-113521 and its English summary provided by Applicant's foreign counsel.

* cited by examiner

ANGULAR VELOCITY SENSOR WITH FLEXIBLE PARTS PROVIDING DIFFERENT RIGIDITIES

CROSS REFERENCE TO RELATED APPLICATION

This application is a continuation of U.S. patent application Ser. No. 13/903,782 filed on of May 28, 2013, which claims the benefit of Korean Patent Application No. 10-2012-0056905, filed on May 29, 2012, entitled "Angular Velocity Sensor" which is hereby incorporated by reference in its entirety into this application.

BACKGROUND OF THE INVENTION

1. Technical Field

The present invention relates to an angular velocity sensor.

2. Description of the Related Art

Recently, an angular velocity sensor has been used in various fields, for example, the military, such as an artificial satellite, a missile, an unmanned aircraft, or the like, vehicles, such as an air bag, electronic stability control (ESC), a black box for a vehicle, or the like, hand shaking prevention of a camcorder, motion sensing of a mobile phone or a game machine, navigation, or the like.

The angular velocity sensor generally adopts a configuration in which a mass body is bonded to a flexible substrate such as a membrane, or the like, so as to measure acceleration and angular velocity. Through the configuration, the angular velocity sensor may calculate the angular velocity by measuring Coriolis force applied to the mass body.

A process of measuring the acceleration and the angular velocity by using the angular velocity sensor will be described in detail below. First, the angular velocity may be obtained by Coriolis force "$F=2m\Omega \cdot v$", where "F" represents the Coriolis force applied to the mass body, "m" represents the mass of the mass body, "$\Omega$" represents the angular velocity to be measured, and "v" represents the motion velocity of the mass body. Among others, since the motion velocity v of the mass body and the mass m of the mass body are values that are known in advance, the angular velocity $\Omega$ may be obtained by sensing the Coriolis force (F) applied to the mass body.

Meanwhile, the angular velocity sensor according to the prior art includes a piezoelectric material formed over a membrane (diaphragm) so as to drive the mass body or sense a displacement of the mass body, as described in a patent document of the following prior art document. In order to measure angular velocity with the angular velocity sensor, it is preferable to substantially coincide a resonance frequency of a driving mode to a resonance frequency of a sensing mode. However, very large interference occurs between the driving mode and the sensing mode due to fine manufacturing errors caused by shape/stress/physical properties, and the like. Therefore, noise signals much larger than the angular signal are output and then, circuit amplification of the angular signal is limited, thereby degrading sensitivity of the angular velocity sensor.

PRIOR ART DOCUMENT

Patent Document (Patent Document 1) US20110146404 A1

SUMMARY OF THE INVENTION

The present invention has been made in an effort to provide an angular velocity sensor including two frames to individually generate a driving displacement and a sensing displacement of a mass body and forming a flexible part s as to move a mass body only in a specific direction, thereby removing interference between a driving mode and a sensing mode and reducing an influence due to manufacturing errors.

According to a preferred embodiment of the present invention, there is provided an angular velocity sensor, including: a mass body; a first frame disposed at an outer side of the mass body so as to be spaced apart from the mass body; a first flexible part connecting the mass body with the first frame in an X-axis direction; a second flexible part connecting the mass body with the first frame in a Y-axis direction; a second frame disposed at an outer side of the first frame so as to be spaced apart from the first frame; a third flexible part connecting the first frame with the second frame in a X-axis direction; and a fourth flexible part connecting the first frame with the second frame in an Y-axis direction, wherein a width in a Y-axis direction of the first flexible part is larger than a thickness in a Z-axis direction thereof, a thickness in a Z-axis direction of the second flexible part is larger than a width in an X-axis direction thereof, a thickness in a Z-axis direction of the third flexible part is larger than a width in a Y-axis direction thereof, and a width in an X-axis direction of the fourth flexible part is larger than a thickness in a Z-axis direction thereof.

The mass body may rotate with respect to the first frame based on the Y axis.

The first frame may rotate with respect to the second frame based on the X axis.

Bending stress may be generated in the first flexible part and torsion stress may be generated in the second flexible part.

Torsion stress may be generated in the third flexible part and bending stress may be generated in the fourth flexible part.

The second flexible part may be disposed at a higher position than the center of gravity of the mass body based on the Z-axis direction.

The second flexible part may be disposed at a position corresponding to the center of gravity of the mass body based on the Y-axis direction.

The first flexible part may connect both sides or one side of the mass body and the first frame with each other.

The second flexible part may connect both sides or one side of the mass body and the first frame with each other.

The third flexible part may connect both sides or one side of the first frame and the second frame with each other.

The fourth flexible part may connect both sides or one side of the first frame and the second frame with each other.

The angular velocity sensor may further include: a sensing unit disposed in the first flexible part to sense displacement of the mass body.

The sensing unit may sense a displacement generated when the mass body rotates based on the Y axis.

The angular velocity sensor may further include: a driving unit disposed in the fourth flexible part to drive the first frame.

The driving unit may be driven to rotate the first frame based on the X axis.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 1:
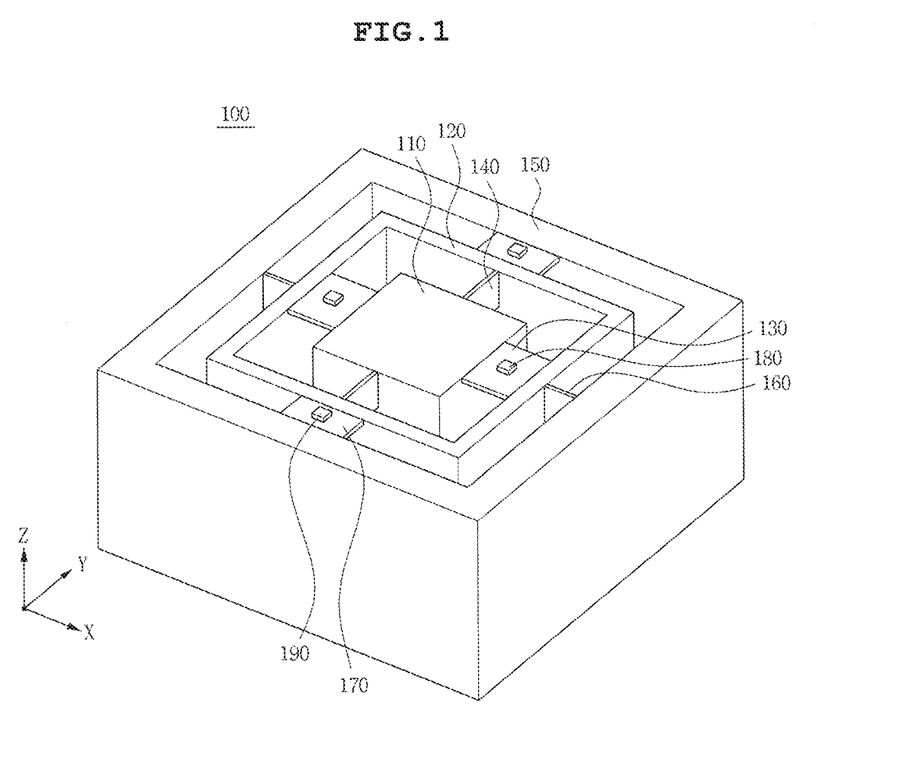
FIG. 1 is a perspective view of an angular velocity sensor according to a preferred embodiment of the present invention.
Figure 2:
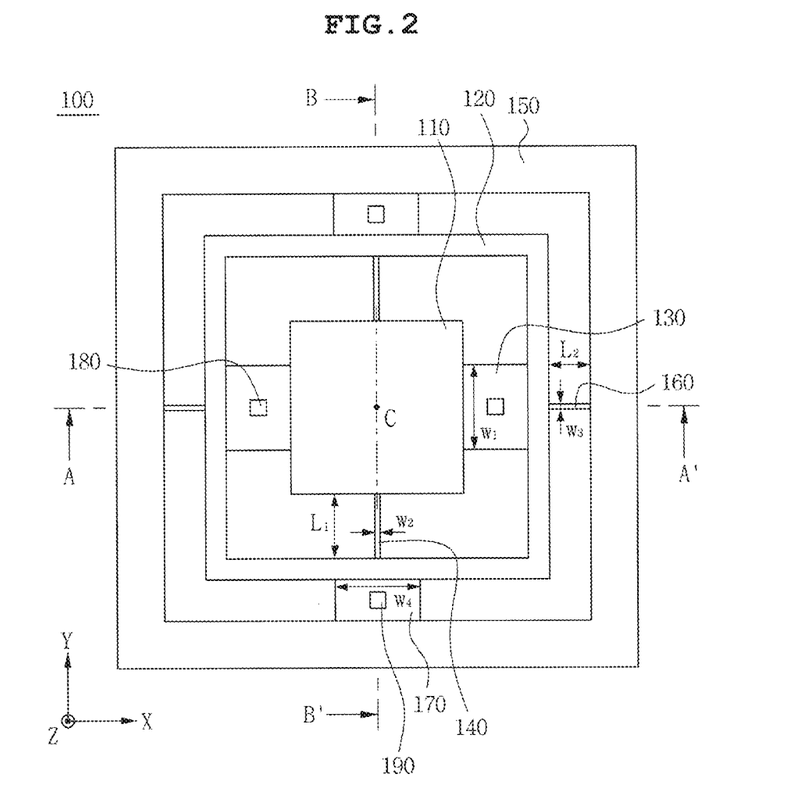
FIG. 2 is a plan view of the angular velocity sensor shown in FIG. 1.
Figure 3:
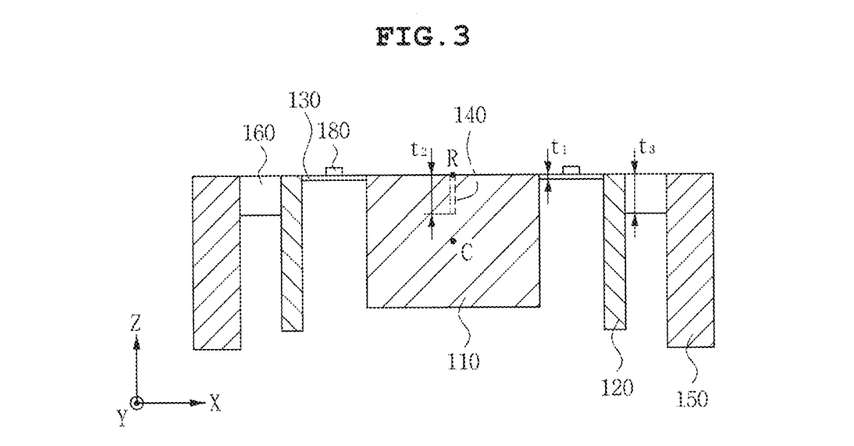
FIG. 3 is a cross-sectional view of the angular velocity sensor taken along the line A-A' shown in FIG. 2.
Figure 4:
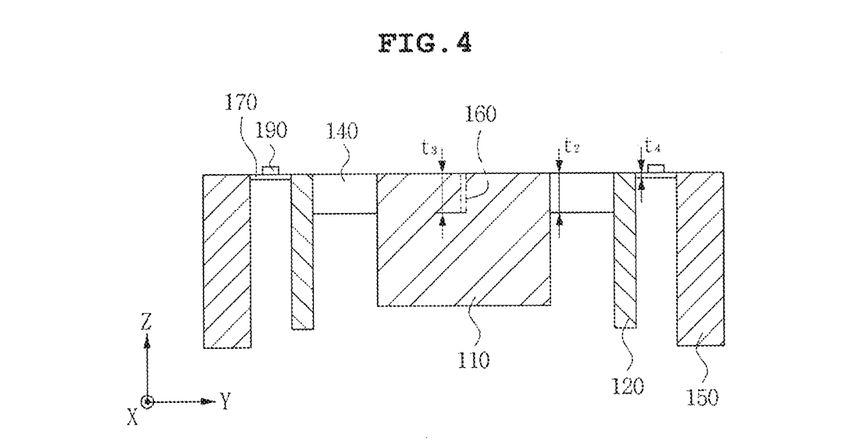
FIG. 4 is a cross-sectional view of the angular velocity sensor taken along the line B-B' shown in FIG. 2.
Figure 5:
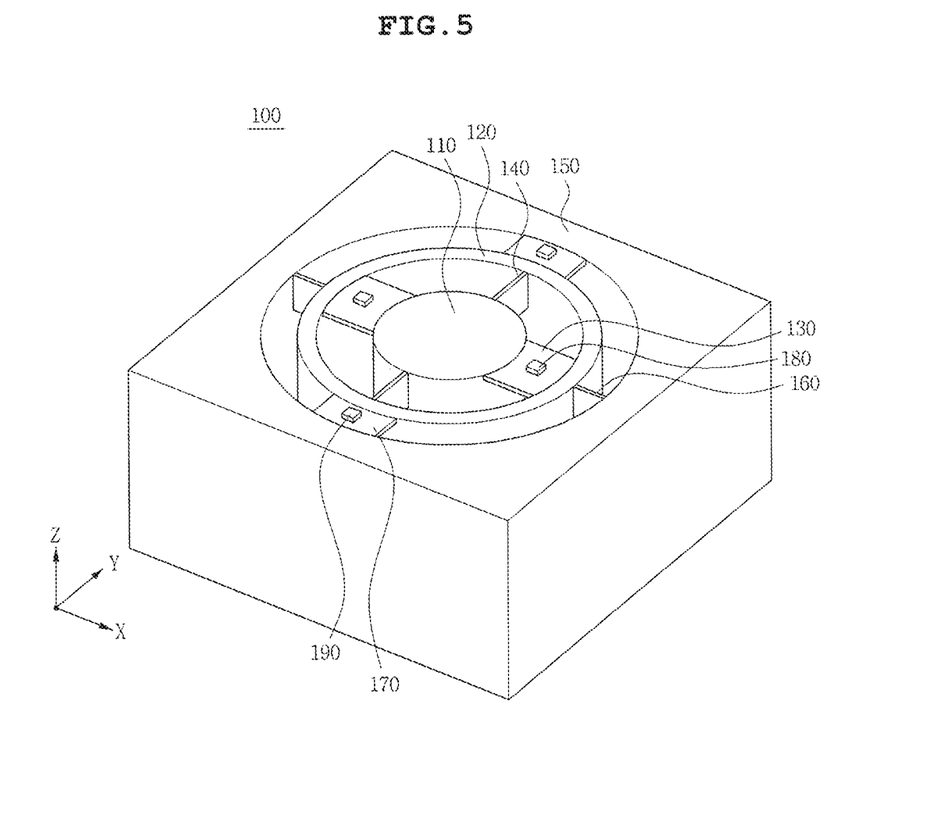
FIG. 5 is a perspective view showing a modification example of an angular velocity sensor according to a preferred embodiment of the present invention.

FIG. 1 is a perspective view of an angular velocity sensor according to a preferred embodiment of the present invention, FIG. 2 is a plan view of the angular velocity sensor shown in FIG. 1, FIG. 3 is a cross-sectional view of the angular velocity sensor taken along the line A-A' shown in FIG. 2, FIG. 4 is a cross-sectional view of the angular velocity sensor taken along the line B-B' shown in FIG. 2, and FIG. 5 is a perspective view showing a modification example of an angular velocity sensor according to a preferred embodiment of the present invention.

As shown in FIGS. 1 to 4, an angular velocity sensor 100 according to an embodiment of the present invention is configured to include a mass body 110, a first frame 120 disposed at an outer side of the mass body 110 so as to be spaced apart from the mass body 110, a first flexible part 130 connecting the mass body 110 to the first frame 120 in an X-axis direction, a second flexible part 140 connecting the mass body 110 with the first frame 120 in a Y-axis direction, a second frame 150 disposed at an outer side of the first frame 120 so as to be spaced apart from the first frame 120, a third flexible part 160 connecting the first frame 120 with the second frame 150 in an X-axis direction, and a fourth flexible part 170 connecting the first frame 120 with the second frame 150 in a Y-axis direction. In this configuration, a width $w_1$ in the Y-axis direction of the first flexible part 130 is larger than a thickness $t_1$ in a Z-axis direction thereof and a thickness $t_2$ in a Z-axis direction of the second flexible part 140 is larger than a width $w_2$ in the X-axis direction thereof. In addition, a thickness $t_3$ in the Z-axis direction of the third flexible part 160 is larger than a width $w_3$ in the Y-axis direction thereof and a width $w_4$ in the X-axis direction of the fourth flexible part 170 is larger than a thickness $t_4$ in the Z-axis direction thereof.

The mass body 110 is displaced by Coriolis force and therefore, is connected with the first frame 120 through the first flexible part 130 and the second flexible part 140. Here, the mass body 110 is displaced based on the first frame 120 by bending of the first flexible part 130 and torsion of the second flexible part 140 when Coriolis force is applied thereto. In this case, the mass body 110 rotates with respect to the first frame 120 based on a Y axis. The detailed contents thereof will be described below. Meanwhile, the mass body 110 is shown in a square pillar shape but is not limited thereto. For example, as shown in FIG. 5, the mass body 110 may be formed in a cylindrical shape. In addition to this, the mass body 110 may be formed as all the shapes known to those skilled in the art, such as a fan shape.

The first frame 120 supports the first flexible part 130 and the second flexible part 140 to secure a space in which the mass body 110 may be displaced and is a reference when the mass body is displaced. Here, the first frame 120 is disposed at the outer side of the mass body 110 so as to be spaced apart from the mass body 110. In this case, the first frame 120 may be a square pillar shape having a cavity in a square pillar shape formed at the center thereof but is not limited thereto. For example, as shown in FIG. 5, the first frame 120 may be a cylindrical shape having a cylindrical cavity formed at a center thereof. Meanwhile, the first frame 120 is connected to the second frame 150 through the third flexible part 160 and the fourth flexible part 170. Here, when the first frame 120 is driven by a driving unit 190, the first frame 120 is displaced based on the second frame 150 by the torsion of the flexible part 160 and the bending of the fourth flexible part 170. In this case, the first frame 120 rotates with respect to the second frame 150 based on the X axis and the detailed contents thereof will be described below.

Figure 14:
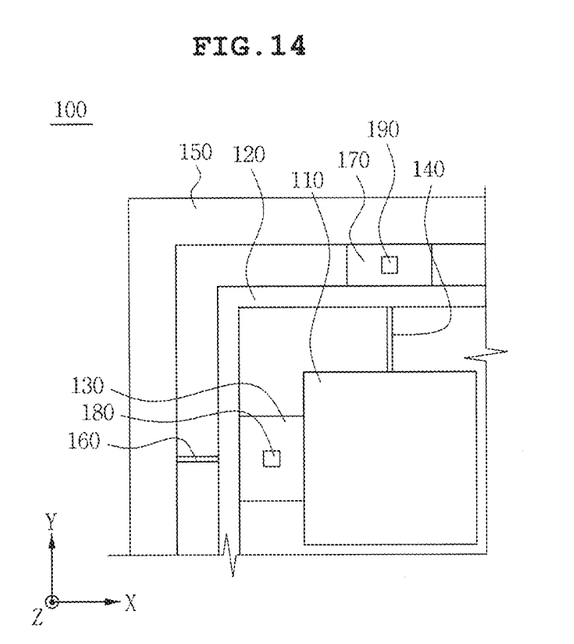
FIG. 14 is a perspective view showing another modification example of an angular velocity sensor according to a preferred embodiment of the present invention.

The first and second flexible parts 130 and 140 serve to connect the first frame 120 with the mass body 110 so that the mass body 110 may be displaced based on the first frame 120, wherein the first flexible part 130 and the second flexible part 140 are formed so as to be vertical to each other. That is, the first flexible part 130 connects the mass body 110 with the first frame 120 in an X-axis direction and the second flexible part 140 connects the mass body 110 with the first frame 120 in a Y-axis direction. In this case, the first flexible part 130 and the second flexible part 140 may be each connected with both sides of the mass body 110 and the first frame 120. However, as shown in FIG. 14, the first flexible part 130 and the second flexible part 140 may be each connected with only one side of the mass body 110 and the first frame 120, if necessary.

Meanwhile, as shown in FIGS. 2 to 4, a width $w_1$ in the Y-axis direction of the first flexible part 130 is larger than a thickness t1 in the Z-axis direction thereof and a thickness $t_2$ in the Z-axis direction of the second flexible part 140, is larger than a width $w_2$ in the X-axis direction thereof. Due to the characteristics of the first flexible part 130 and the second flexible part 140, the mass body 110 may move only in the specific direction based on the first frame 120.

Figure 6:
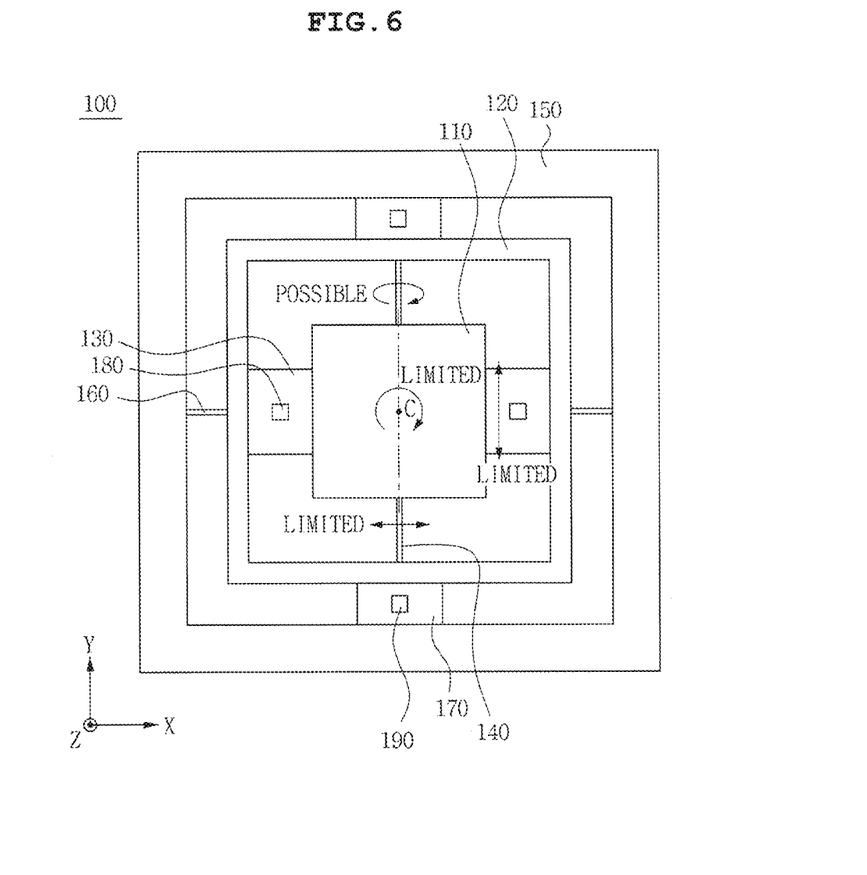
FIG. 6 is a plan view showing a movable direction of a mass body shown in FIG. 2.
Figure 7:
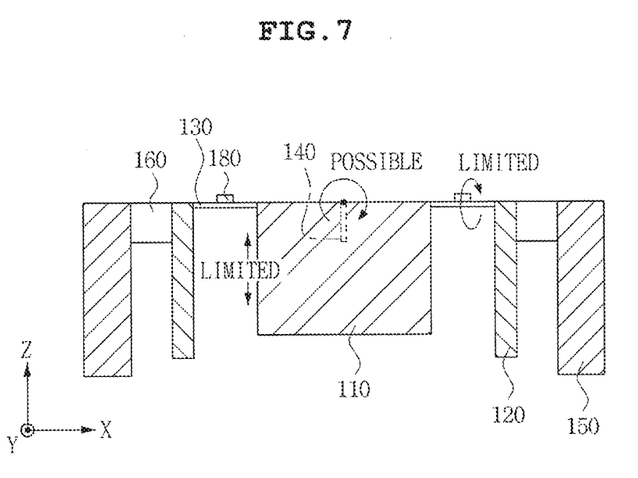
FIG. 7 is a cross-sectional view showing the movable direction of the mass body shown in FIG. 3.

FIG. 6 is a plan view showing a movable direction of a mass body shown in FIG. 2 and FIG. 7 is a plan view showing the movable direction of the mass body shown in FIG. 3. The movable direction of the mass body 110 will be described with reference to FIGS. 6 and 7.

First, the thickness $t_2$ in the Z-axis direction of the second flexible part 140 is larger than a width $w_2$ of the X-axis direction and therefore, the rotation of the mass body 110 with respect to the first frame 120 based on the X axis may be limited or the translation thereof in the Z-axis direction may be limited, but the mass body 110 may relatively freely rotate based on the Y axis.

In detail, as rigidity when the second flexible part 140 rotates based on the X axis is larger than rigidity when the second flexible part 140 rotates based on the Y axis, the mass body 110 may freely rotate based on the Y axis but the rotation thereof based on the X axis is limited. Similarly thereto, as rigidity when the second flexible part 140 is translated based on the Z-axis direction is larger than rigidity when the second flexible part 140 rotates based on the Y axis, the mass body 110 may freely rotate based on the Y axis but the rotation thereof based on the Z-axis direction may be limited. Therefore, as a value of the second flexible part 140 (the rigidity when rotating based on the X axis the rigidity when being translated in the Z-axis direction)/(the rigidity when rotating based on the Y axis) is increased, the mass body 110 freely rotates with respect to the first frame 120 based on the Y axis but the rotation thereof based on the X axis or the translation thereof in the Z-axis direction may be limited.

Referring to FIGS. 2 and 3, the relationship between the thickness $t_2$ in the Z-axis direction, a length $L_1$ in the Y-axis direction, and the width $w_2$ in the X-axis direction of the second flexible part 140 and the rigidity for each direction is arranged as follows.

(1) The rigidity when the second flexible part 140 rotates based on the X axis or the rigidity when the second flexible part 140 is translated in the Z-axis direction becomes $\propto w_2 \times t_2^3/L_1^3$ (2) The rigidity when the second flexible part 140 rotates based on the Y axis becomes $\propto w_2^3 \times t_2/L_1$ According to the above two Equations, the value of the second flexible part 140 (the rigidity when rotating based on the X axis or the rigidity when being translated in the Z-axis direction)/(the rigidity when rotating based on the Y axis) is in proportion to $(t_2/(w_2 L_1))^2$. However, according to the present embodiment, the thickness $t_2$ in the Z-axis direction of the second flexible part 140 is larger than the width $w_2$ in the X-axis direction and therefore, $(t_2/(w_2 L_1))^2$ is large and the value of the second flexible part 140 (the rigidity when rotating based on the X axis or the rigidity when being translated in the Z-axis direction)/(the rigidity when rotating based on the Y axis) is increased accordingly. Due to the characteristics of the second flexible part 140, the mass body 110 freely rotates with respect to the first frame 120 based on the Y axis, but the rotation of the mass body 110 based on the X axis or the translation in the Z-axis direction is limited.

Meanwhile, the first flexible part 130 may limit the rotation of the mass body 110 with respect to the first frame 120 based on the Z axis or the translation of the mass body 110 in the X-axis direction since the longitudinal (the X-axis direction) rigidity is relatively very high (see FIG. 6). In addition, the second flexible part 140 may limit the translation of the mass body 110 in the Y-axis direction respect to the first frame 120 since the longitudinal (the Y-axis direction) rigidity is relatively very high (see FIG. 6).

Consequently, due to the characteristics of the first flexible part 130 and the second flexible part 140 as described above, the mass body 110 may rotate with respect to the first frame 120 based on the Y axis but the rotation thereof based on the X axis or the Z axis may be limited or the translation thereof in the Z-axis, Y-axis, or X-axis direction may be limited. That is, the movable direction of the mass body 110 is arranged as the following Table 1.

TABLE 1

| Movement Direction of Mass Body (Based On First Frame) | Whether or not Movement is possible |
| --- | --- |
| Rotation Based On X Axis | Limited |
| Rotation Based On Y Axis | Possible |
| Rotation Based On Z Axis | Limited |
| Translation In X-Axis Direction | Limited |
| Translation In Y-Axis Direction | Limited |
| Translation In Z-Axis Direction | Limited |

As described above, the mass body 110 may rotate with respect to the first frame 120 based on the Y axis but the movement thereof in the rest directions is limited, such that the mass body 110 may be displaced (the rotation based on the Y axis) only by the force in the desired direction.

Figure 8A:
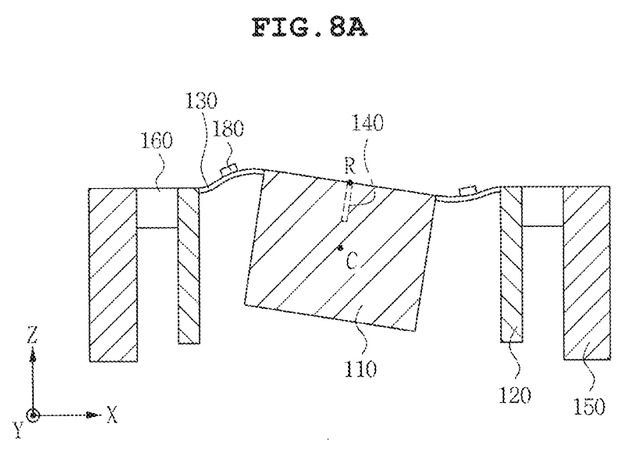
FIGS. 8A and 8B are cross-sectional views showing a process of rotating the mass body shown in FIG. 3 with respect to a first frame based on a Y axis.
Figure 8B:
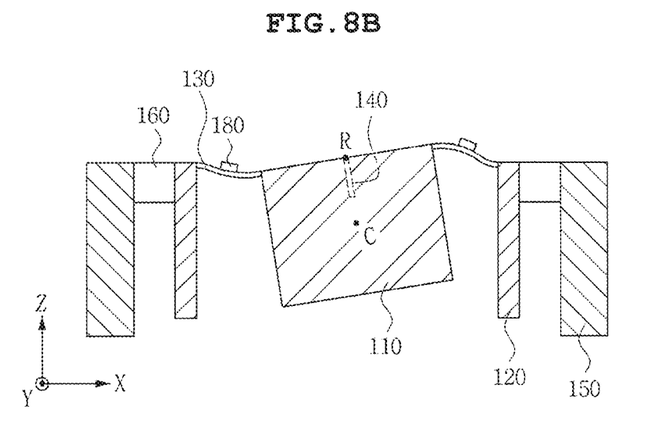

Meanwhile, FIGS. 8A and 8B are cross-sectional views showing a process of rotating the mass body shown in FIG. 3 with respect to a first frame based on a Y axis. As shown in FIGS. 8A and 8B, the mass body 110 rotates with respect to the first frame 120 based on the Y axis as a rotating axis R and therefore, bending stress that is a combination of compression stress and tension stress is generated in the first flexible part 130 and torsion stress is generated in the second flexible part 140 based on a Y axis. In this case, in order to generate a torque in the mass body 110, the second flexible part 140 may be provided at a higher position than the center of gravity C of the mass body 110 based on the Z-axis direction. In addition, as shown in FIG. 2, the second flexible part 140 may be provided at a position corresponding to the center of gravity C of the mass body 110 based on the Y-axis direction so that the mass body 110 accurately rotates based on the Y axis.

The second frame 150 supports the third flexible part 160 and the fourth flexible part 170 to secure a space in which the first frame 120 may be displaced and is a reference when the first frame 120 is displaced. Here, the second frame 150 is disposed at the outer side of the first frame 120 so as to be spaced apart from the first frame 120. In this case, the second frame 150 may be a square pillar shape having a cavity in a square pillar shape formed at the center thereof but is not limited thereto. For example, as shown in FIG. 5, the second frame 150 may be a square pillar shape having a cylindrical cavity formed at a center thereof.

The third and fourth flexible parts 160 and 170 serves to connect the second frame 150 with the first frame 120 so that the first frame 120 may be displaced based on the second frame 150, wherein the third flexible part 160 and the fourth flexible part 170 are formed to be vertical to each other. That is, the third flexible part 160 connects the first frame 120 with the second frame 150 in the X-axis direction and the fourth flexible part 170 connects the first frame 120 with the second frame 150 in the Y-axis direction. In this case, the third flexible part 160 and the fourth flexible part 170 may be each connected with both sides of the first frame 120 and the second frame 150. However, as shown in FIG. 14, the third flexible part 160 and the fourth flexible part 170 may be each connected with only one side of the first frame 120 and the second frame 150, if necessary.

Meanwhile, as shown in FIGS. 2 to 4, in the third flexible part 160, a thickness $t_3$ in the Z-axis direction is larger than a width $w_3$ in the Y-axis direction and in the fourth flexible part 170, a width $w_4$ in the X-axis direction is larger than a thickness $t_4$ in the Z-axis direction. Due to the characteristics of the third flexible part 160 and the fourth flexible part 170, the first frame 120 may move only in the specific direction based on the second frame 150.

Figure 9:
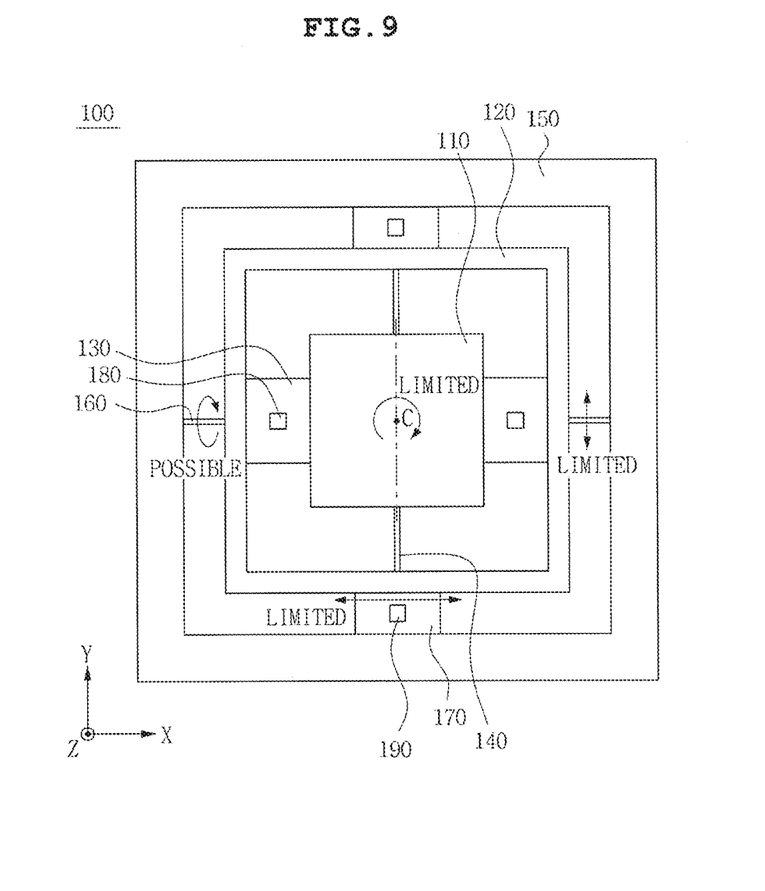
FIG. 9 is a plan view showing a movable direction of a first frame shown in FIG. 2.
Figure 10:
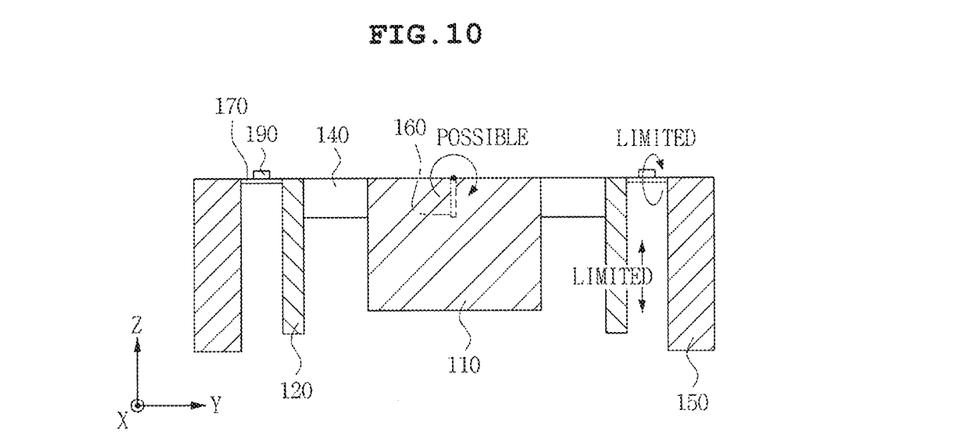
FIG. 10 is a cross-sectional view showing the movable direction of the first frame shown in FIG. 4.

FIG. 9 is a plan view showing a movable direction of a first frame shown in FIG. 2 and FIG. 10 is a cross-sectional view showing the movable direction of the first frame shown in FIG. 4. The movable direction of the first frame 120 will be described with reference to FIGS. 9 and 10.

First, the thickness $t_3$ in the Z-axis direction of the third flexible part 160 is larger than a width $w_3$ of the Y-axis direction and therefore, the rotation of the first frame 120 with respect to the second frame 150 based on the Y axis may be limited or the translation thereof in the Z-axis direction may be limited but the first frame 120 may relatively freely rotate based on the X axis (see FIG. 10).

In detail, as the rigidity when the third flexible part 160 rotates based on the Y axis is larger than the rigidity when the third flexible part 160 rotates based on the X axis, the first frame 120 may freely rotate based on the X axis but the rotation thereof based on the Y axis is limited. Similarly thereto, as the rigidity when the third flexible part 160 is translated in the Z-axis direction is larger than the rigidity when the third flexible part 160 rotates based on the X axis, the first frame 120 may freely rotate based on the X axis but the translation thereof in the Z-axis direction is limited. Therefore, as the value of the third flexible part 160 (the rigidity when rotating based on the Y axis or the rigidity when being translated in the Z-axis direction)/(the rigidity when rotating based on the X axis) is increased, the first frame 120 freely rotates with respect to the second frame 150 based on the X axis but the rotation thereof based on the Y axis or the translation thereof in the Z-axis direction is limited.

Referring to FIGS. 2 and 4, the relationship between the thickness $t_3$ in the Z-axis direction, a length $L_2$ in the X-axis direction, and the width $w_3$ in the Y-axis direction of the third flexible part 160 and the rigidity for each direction is arranged as follows.

(1) The rigidity when the third flexible part 160 rotates based on the Y axis or the rigidity when the third flexible part 160 is translated in the Z-axis direction becomes $\propto w_3 \times t_3^3 / L_2^3$ (2) The rigidity when the third flexible part 160 rotates based on the X axis becomes $\propto w_3^3 \times t_3 / L_2$ According to the above two Equations, the value of the third flexible part 160 (the rigidity when rotating rotates based on the Y axis or the rigidity when being translated in the Z-axis direction)/(the rigidity when rotating based on the X axis) is in proportion to $(t_3/(w_3 L_2))^2$. However, according to the present embodiment, the thickness $t_3$ in the Z-axis direction of the third flexible part 160 is larger than the width $w_3$ in the Y-axis direction and therefore, $(t_3/(w_3 L_2))^2$ is large and the value of the third flexible part 160 (the rigidity when rotating based on the Y axis or the rigidity when being translated in the Z-axis direction)/(the rigidity when rotating based on the X axis) is increased accordingly. Due to the characteristics of the third flexible part 160, the first frame 120 freely rotates with respect to the second frame 150 based on the X axis, but the rotation of the first frame 120 based on the Y axis is limited or the translation thereof in the Z-axis direction is limited.

Meanwhile, the fourth flexible part 170 may limit the rotation of the first frame 120 with respect to the second frame 150 based on the Z axis or the translation of the first frame 120 in the Y-axis direction since the longitudinal (the Y-axis direction) rigidity is relatively very high. Further, the third flexible part 160 may limit the translation of the first frame 120 with respect to the second frame 150 in the X-axis direction since the longitudinal (the X-axis direction) rigidity is relatively very high.

Consequently, due to the characteristics of the third flexible part 160 and the fourth flexible part 170 as described above, the first frame 120 may rotate with respect to the second frame 150 based on the X axis but the rotation of the first frame 120 based on the Y axis or the z axis is limited or the translation thereof in the Z-axis, Y-axis, or X-axis direction is limited. That is, the movable direction of the first frame 120 is arranged as the following Table 2.

TABLE 2

| Movement Direction of First Frame (Based On Second Frame) | Whether or not Movement is possible |
|---|---|
| Rotation Based On X Axis | Possible |
| Rotation Based On Y Axis | Limited |
| Rotation Based On Z Axis | Limited |
| Translation In X-Axis Direction | Limited |
| Translation In Y-Axis Direction | Limited |
| Translation In Z-Axis Direction | Limited |

As described above, the first frame 120 may rotate with respect to the second frame 150 based on the X axis but the movement thereof in the rest directions is limited, such that the first frame 120 may be displaced (the rotation based on the X axis) only by the force in the desired direction.

Figure 11A:
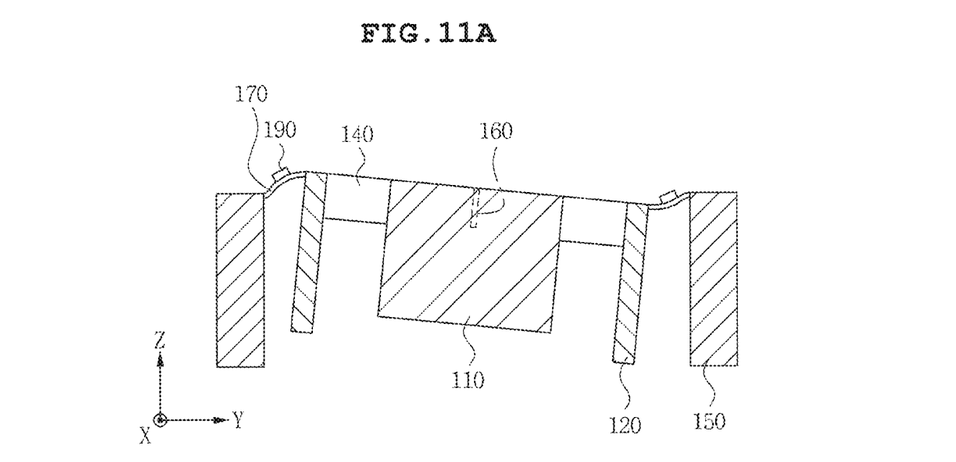
FIGS. 11A and 11B are cross-sectional views showing a process of rotating the first frame shown in FIG. 4 with respect to a second frame based on an X axis.
Figure 11B:
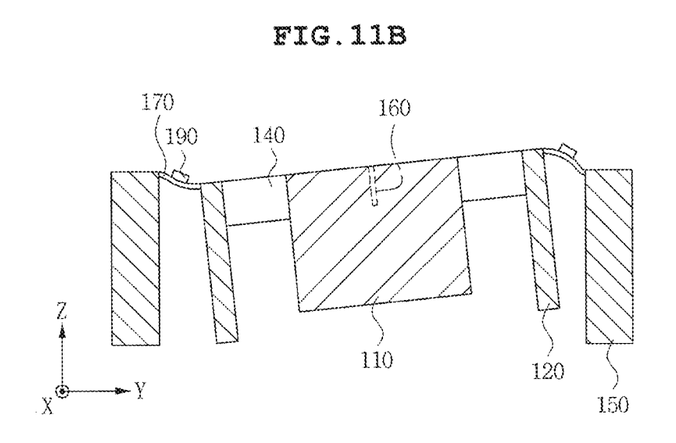

Meanwhile, FIGS. 11A and 11B are cross-sectional views showing a process of rotating the first frame shown in FIG. 4 with respect to a second frame based on an X axis. As shown in FIGS. 11A and 11B, the first frame 120 rotates with respect to the second frame 150 based on the X axis and therefore, the torsion stress is generated in the third flexible part 160 based on the X axis and the bending stress that is a combination of the compression stress and the tension stress is generated in the fourth flexible part 170.

In addition, as shown in FIG. 2, when viewed based on an XY plane, the first flexible part 130 is relatively wide but the second flexible part 140 is relatively narrow, such that the first flexible part 130 may be provided with a sensing unit 180 sensing the displacement of the mass body 110. Here, the sensing unit 180 may sense the displacement of the mass body 110 rotating based on the Y axis. In this case, the sensing unit 180 is not particularly limited, but may be formed using a piezoelectric type, a piezoresistive type, a capacitive type, an optical type, and the like.

In addition, when viewed based on the XY plane, the fourth flexible part 170 is relatively wide but the third flexible part 160 is relatively narrow, such that the fourth flexible part 170 may be provided with a driving unit 190 driving the first frame 120. Here, the driving unit 1290 may be driven to rotate the first frame 120 based on the X axis. In this case, the driving unit 190 is not particularly limited, but may be formed using a piezoelectric type, a capacitive type, and the like.

Figure 12A:
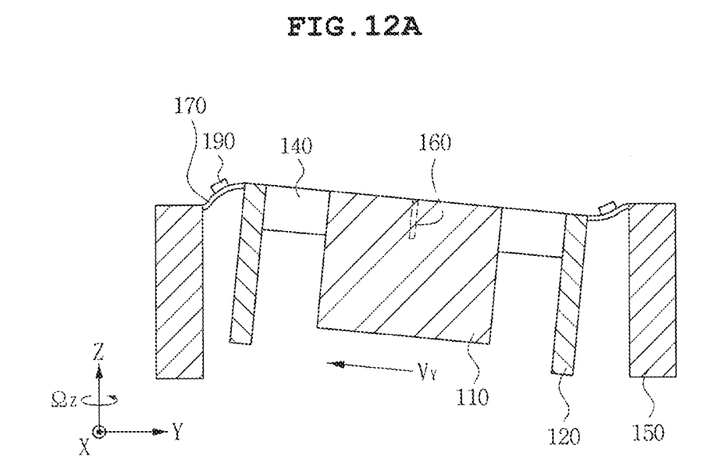
FIGS. 12A, 12B, 13A and 13B are cross-sectional views showing a process of measuring angular velocity by an angular velocity sensor according to the preferred embodiment of the present invention.
Figure 12B:
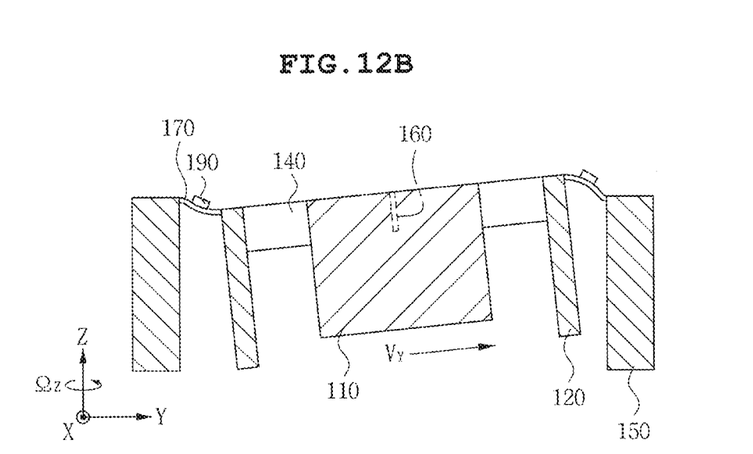
Figure 13A:
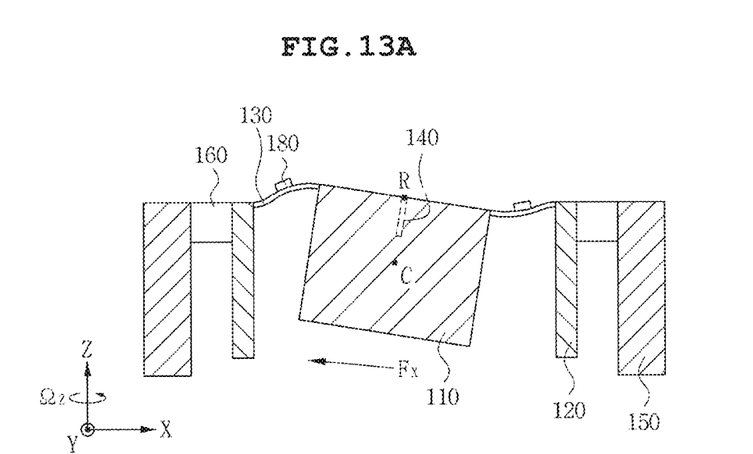
Figure 13B:
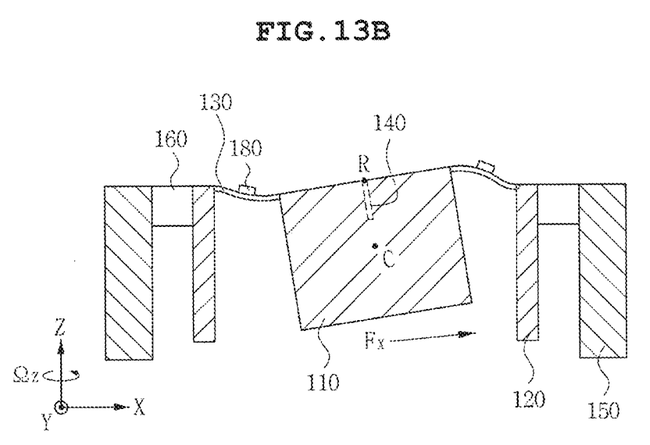

Meanwhile, the angular velocity sensor 100 according to the present embodiment may measure the angular velocity using the above-mentioned structural characteristics. FIGS. 12 and 13 are cross-sectional views showing a process of measuring angular velocity by an angular velocity sensor. A process of measuring angular velocity will be described with reference to FIGS. 12 and 13.

First, as shown in FIGS. 12A and 12B, the driving unit 190 rotates the first frame 120 with respect to the second frame 150 based on the X axis (driving mode). Here, the mass body 110 is vibrated while rotating based on the X axis together with the first frame 120 and speed VY is generated in the mass body 110 in the Y-axis direction. In this case, when angular velocity $\Omega_Z$ based on the Z axis is applied to the mass body 110, Coriolis force $F_x$ is generated in the X-axis direction.

As shown in FIGS. 13A and 13B, the mass body 110 is displaced while rotating with respect to the first frame 120 based on the Y axis by the Coriolis force $F_x$ and the sensing unit 180 senses the displacement of the mass body 110 (sensing mode). The Coriolis force $F_x$ may be calculated by sensing the displacement of the mass body 110 and the angular velocity $\Omega_Z$ may be measured based on the Z axis by the Coriolis force $F_x$.

Meanwhile, due to the characteristics of the first flexible part 130 and the second flexible part 140 as described above, the mass body 110 may rotate the first frame 120 based on only the Y axis. Therefore, as shown in FIGS. 12A and 12B, even though the driving unit 190 rotates the first frame 120 with respect to the second frame 150 based on the X axis, the mass body 110 does not rotate with respect to the first frame 120 based on the X axis. Further, due to the characteristics of the third flexible part 160 and the fourth flexible part 170, the first frame 120 may rotate with the second frame 150 based on only the X axis. Therefore, as shown in FIGS. 13A and 13B, when the displacement of the mass body 110 is sensed using the sensing unit 180, the first frame 120 does not rotate with respect to the second frame 150 based on the Y axis and only the mass body 110 rotates with respect to the first frame 120 in the Y-axis direction, even though the Coriolis force $F_x$ in the X-axis direction is applied As described above, the angular velocity sensor 100 according to the present embodiment includes the first frame 120 and the second frame 150 to individually generate the driving displacement and the sensing displacement of the mass body 110 and the first, second, third, and fourth flexible parts 130, 140, 160, and 170 are formed so as to move the mass body 110 and the first frame 120 only in the specific direction. Therefore, it is impossible to improve sensitivity by increasing the circuit amplification ratio by removing the interference between the driving mode and the sensing mode and improve the yield by reducing the influence due to the manufacturing errors.

According to the preferred embodiment, two frames are provided to individually generate the driving displacement and the sensing displacement of the mass body and the flexible part is formed so as to move the mass body only in the specific direction. Therefore, it is possible to improve sensitivity by increasing the circuit amplification ratio by removing the interference between the driving mode and the sensing mode and improve the yield by reducing the influence due to the manufacturing errors.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention. In particular, the present invention describes based on the "X axis", "Y axis", and "Z axis", which is defined for convenience of explanation and therefore, the scope of the present invention is not limited thereto.

Accordingly, any and all modifications, variations or equivalent arrangements should be considered to be within the scope of the invention, and the detailed scope of the invention will be disclosed by the accompanying claims.

What is claimed is:

1. An angular velocity sensor, comprising:
a mass body;
a first frame disposed around the mass body;
a first flexible part connecting the mass body with the first frame in a first axis direction;
a second flexible part connecting the mass body with the first frame in a second axis direction that is orthogonal to the first axis direction;
a second frame disposed around the first frame;
a third flexible part connecting the first frame with the second frame in the first axis direction; and
a fourth flexible part connecting the first frame with the second frame in the second axis direction,
wherein the first flexible part and the second flexible part are respectively configured to provide a first rigidity resisting rotation of the mass body with respect to the first frame relative to the first axis direction, and to provide a second rigidity resisting rotation of the mass body with respect to the first frame relative to the second axis direction, respectively, the first rigidity being greater than the second rigidity, and
wherein the third flexible part and the fourth flexible part are respectively configured to provide a third rigidity resisting rotation of the first frame with respect to the second frame relative to the second axis direction, and to provide a fourth rigidity resisting rotation of the first frame with respect to the second frame relative to the first axis direction, respectively, the third rigidity being greater than the fourth rigidity.

2. The angular velocity sensor of claim 1, wherein, in response to the mass body rotating with respect to the first frame relative to the second axis direction, bending stress is generated in the first flexible part and torsion stress is generated in the second flexible part.

3. The angular velocity sensor of claim 1, wherein, in response to the first frame rotating with respect to the second frame relative to the first axis direction, torsion stress is generated in the third flexible part and bending stress is generated in the fourth flexible part.

4. The angular velocity sensor of claim 1, wherein the second flexible part is disposed at a higher position than a center of gravity of the mass body based on a third axis direction that is orthogonal to the first axis direction and the second axis direction.

5. The angular velocity sensor of claim 1, wherein the second flexible part is disposed at a position corresponding to a center of gravity of the mass body based on the second axis direction.

6. The angular velocity sensor as set forth in claim 1, wherein the first flexible part connects two sides or one side of the mass body and the first frame with each other.

7. The angular velocity sensor of claim 1, wherein the second flexible part connects two sides or one side of the mass body and the first frame with each other.

8. The angular velocity sensor of claim 1, wherein the third flexible part connects two sides or one side of the first frame and the second frame with each other.

9. The angular velocity sensor of claim 1, wherein the fourth flexible part connects two sides or one side of the first frame and the second frame with each other.

10. The angular velocity sensor of claim 1, further comprising:
a sensing unit disposed in the first flexible part and configured to sense displacement of the mass body.

11. The angular velocity sensor of claim 10, wherein the sensing unit is configured to sense a displacement generated when the mass body rotates relative to the second axis direction.

12. The angular velocity sensor of claim 1, further comprising:
a driving unit disposed in the fourth flexible part and configured to drive the first frame.

13. The angular velocity sensor of claim 12, wherein the driving unit is configured to be driven to rotate the first frame relative to the first axis direction.

14. The angular velocity sensor of claim 1, wherein:
a width of the first flexible part in the second axis direction is larger than a thickness of the first flexible part in a third axis direction, the third axis direction being orthogonal to the first axis direction and the second axis direction;
a thickness of the second flexible part in the third axis direction is larger than a width of the second flexible part in the first axis direction;
a thickness of the third flexible part in the third axis direction is larger than a width of the third flexible part in the second axis direction; and
a width of the fourth flexible part in the first axis direction is larger than a thickness of the fourth flexible part in the third axis direction.

* * * * *